(12) United States Patent
Li et al.

(10) Patent No.: US 10,069,956 B2
(45) Date of Patent: Sep. 4, 2018

(54) APPARATUS, METHOD, AND PROGRAM PRODUCT FOR PERFORMING AN ACTION IN RESPONSE TO A MOVEMENT

(71) Applicant: LENOVO (Singapore) PTE. LTD., New Tech Park (SG)

(72) Inventors: Scott Wentao Li, Cary, NC (US); Robert James Kapinos, Durham, NC (US); Timothy Winthrop Kingsbury, Cary, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/357,431

(22) Filed: Nov. 21, 2016

(65) Prior Publication Data

US 2018/0146080 A1    May 24, 2018

(51) Int. Cl.
  *H04M 1/00*     (2006.01)
  *H04M 1/725*    (2006.01)
  *G06F 3/01*     (2006.01)

(52) U.S. Cl.
  CPC ......... *H04M 1/72519* (2013.01); *G06F 3/011* (2013.01)

(58) Field of Classification Search
  USPC ......... 455/550.1, 556.1, 575.1–575.8, 569.1, 455/557
  See application file for complete search history.

(56) References Cited

U.S. PATENT DOCUMENTS

| | | | |
|---|---|---|---|
| 8,994,647 B2* | 3/2015 | Taniguchi | G06F 1/163 345/156 |
| 2011/0125063 A1* | 5/2011 | Shalon | A61B 5/0006 600/590 |
| 2012/0001846 A1* | 1/2012 | Taniguchi | G06F 1/163 345/156 |
| 2014/0078049 A1* | 3/2014 | Parshionikar | G06F 3/017 345/156 |
| 2015/0163546 A1* | 6/2015 | Weast | H04N 21/4436 |
| 2016/0109961 A1* | 4/2016 | Parshionikar | G06F 3/013 345/156 |

\* cited by examiner

*Primary Examiner* — Fayyaz Alam
(74) *Attorney, Agent, or Firm* — Kunzler, PC

(57) ABSTRACT

Apparatuses, methods, and program products are disclosed for performing an action in response to a movement. One apparatus includes a sensor, a processor, and a memory that stores code executable by the processor. The code is executable by the processor to detect, by use of the sensor, movement of one or more facial parts of a user. The sensor is positioned in an ear canal of the user. The code is executable by the processor to perform a predetermined action in response to detecting the movement of the one or more facial parts.

15 Claims, 6 Drawing Sheets

APPARATUS, METHOD, AND PROGRAM PRODUCT FOR PERFORMING AN ACTION IN RESPONSE TO A MOVEMENT

FIELD

The subject matter disclosed herein relates to performing an action and more particularly relates to performing an action in response to a movement.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions. Performing various actions, such as voice controlled actions, may be difficult to perform in noisy environments and may take an excessive amount of time to perform.

BRIEF SUMMARY

An apparatus for performing an action in response to a movement is disclosed. A method and computer program product also perform the functions of the apparatus. In one embodiment, the apparatus includes a sensor, a processor, and a memory that stores code executable by the processor. The code, in various embodiments, is executable by the processor to detect, by use of the sensor, movement of one or more facial parts of a user. In such an embodiment, the sensor is positioned in an ear canal of the user. The code, in some embodiments, is executable by the processor to perform a predetermined action in response to detecting the movement of the one or more facial parts.

In some embodiments, the code executable by the processor performs an action selected from the group consisting of activating a voice control feature, answering a phone call, rejecting a phone call, hanging up a phone call, and putting a phone call on hold. In one embodiment, the code executable by the processor provides an indication signifying performance of the predetermined action.

In another embodiment, the code executable by the processor performs a first predetermined action in response to detecting movement of an upper jawbone toward a lower jawbone. In some embodiments, the code executable by the processor performs a second predetermined action in response to detecting movement of an upper jawbone away from a lower jawbone.

A method for performing an action in response to a movement, in one embodiment, includes detecting, by use of a sensor, movement of one or more facial parts of a user. In such embodiments, the sensor is positioned in an ear canal of the user. In a further embodiment, the method includes performing a predetermined action in response to detecting the movement of the one or more facial parts.

In some embodiments, detecting movement of the one or more facial parts includes detecting movement of an upper jawbone relative to a lower jawbone using a pressure sensor positioned in the ear canal. In various embodiments, performing the predetermined action includes performing an action selected from the group consisting of activating a voice control feature, answering a phone call, rejecting a phone call, hanging up a phone call, and putting a phone call on hold. In one embodiment, the method includes providing an indication signifying performance of the predetermined action. In such an embodiment, providing the indication includes providing haptic feedback.

In some embodiments, the method includes performing a first predetermined action in response to detecting movement of an upper jawbone toward a lower jawbone. In certain embodiments, the method includes performing a second predetermined action in response to detecting movement of an upper jawbone away from a lower jawbone. In various embodiments, the method includes detecting a head motion of the user. In such embodiments, performing the predetermined action in response to detecting the movement of the one or more facial parts further includes performing the predetermined action in response to detecting the head motion.

In one embodiment, a program product includes a computer readable storage medium that stores code executable by a processor. The executable code, in certain embodiments, includes code to perform detecting, by use of a sensor, movement of one or more facial parts of a user. In such an embodiment, the sensor is positioned in an ear canal of the user. The executable code, in some embodiments, includes code to perform performing a predetermined action in response to detecting the movement of the one or more facial parts.

In certain embodiments, the executable code includes code to perform providing an indication signifying performance of the predetermined action. In some embodiments, providing the indication includes providing haptic feedback. In various embodiments, the executable code includes code to perform performing a first predetermined action in response to detecting movement of an upper jawbone toward a lower jawbone.

In one embodiment, the executable code includes code to perform performing a second predetermined action in response to detecting movement of an upper jawbone away from a lower jawbone. In certain embodiments, the executable code includes code to perform detecting a head motion of the user, and performing the predetermined action in response to detecting the movement of the one or more facial parts and in response to detecting the head motion.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
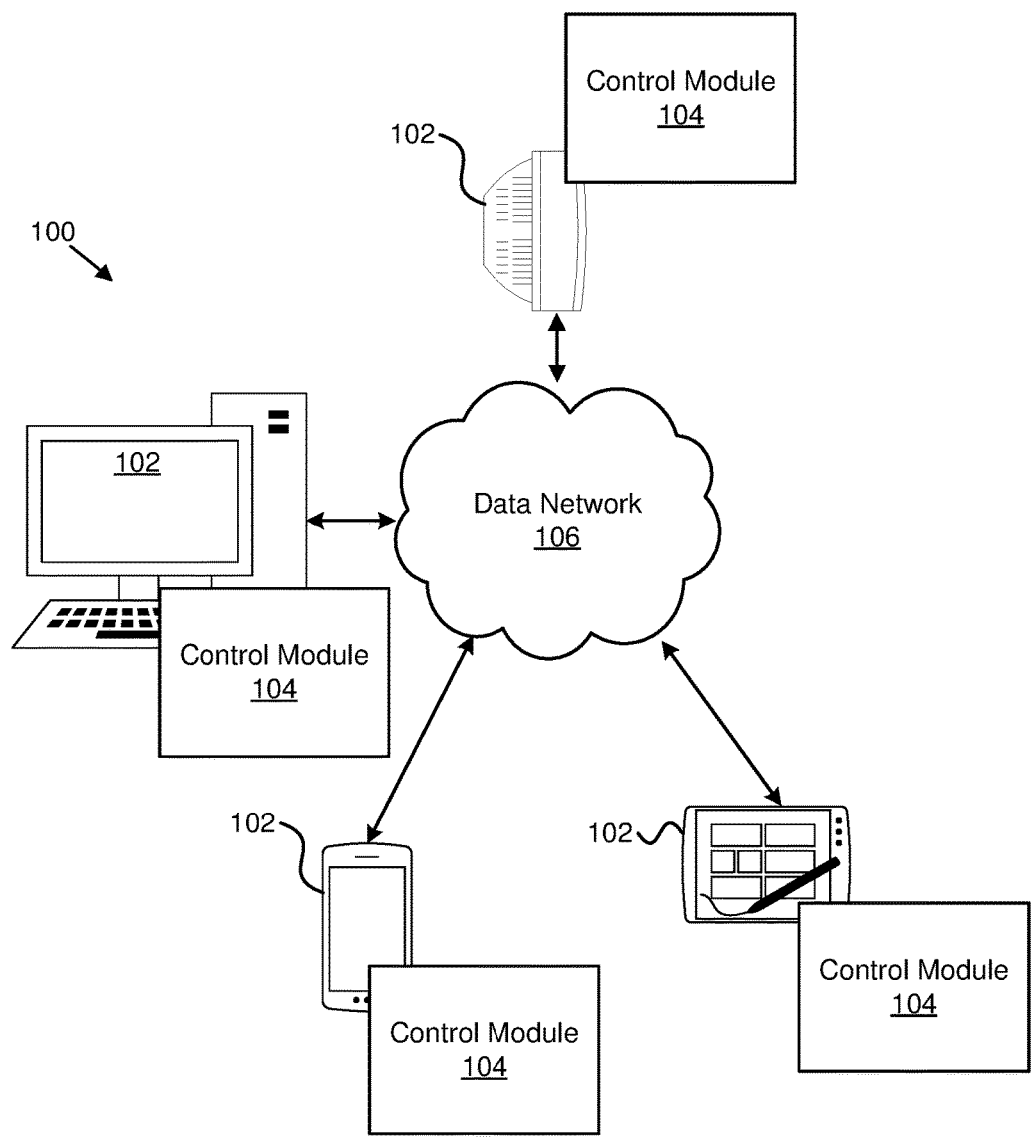
FIG. 1 is a schematic block diagram illustrating one embodiment of a system for performing an action in response to a movement.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for performing an action in response to a movement. In one embodiment, the system 100 includes information handling devices 102, control modules 104, and data networks 106. Even though a specific number of information handling devices 102, control modules 104, and data networks 106 are depicted in FIG. 1, one of skill in the art will recognize that any number of information handling devices 102, control modules 104, and data networks 106 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), streaming devices, or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the control module 104. In certain embodiments, the control module 104 may detect, by use of a sensor, movement of one or more facial parts of a user (e.g., an upper jawbone of a user relative to a lower jawbone of the user). In some embodiments, the sensor is positioned in an ear canal of the user. The control module 104 may also perform a predetermined action in response to detecting the movement of the one or more facial parts of the user. In this manner, the control module 104 may be used for performing an action in response to a movement.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
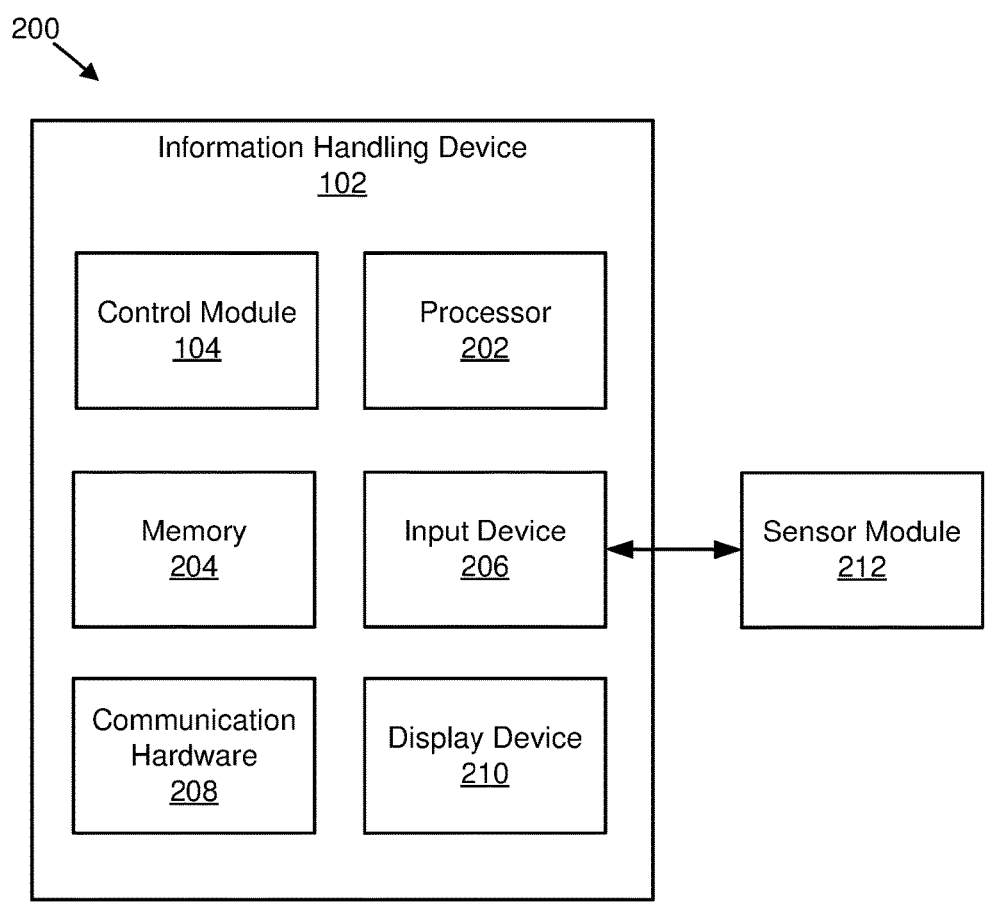
FIG. 2 is a schematic block diagram illustrating one embodiment of an apparatus including an information handling device.

FIG. 2 depicts one embodiment of an apparatus 200 that may be used for performing an action in response to a movement. The apparatus 200 includes one embodiment of the information handling device 102. Furthermore, the information handling device 102 may include the control module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the control module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to performing an action in response to a movement. In some embodiments, the memory 204 also stores program code and related data, such as an operating system or other controller algorithms operating on the information handling device 102.

The information handling device 102 may use the control module 104 for performing an action in response to a movement. As may be appreciated, the control module 104 may include computer hardware, computer software, or a combination of both computer hardware and computer software. For example, the control module 104 may include circuitry, or a processor, used to detect, by user of a sensor module 212, movement of one or more facial parts of a user. As another example, the control module 104 may include computer program code that perform a predetermined action in response to detecting the movement of the one or more facial parts.

The input device 206, in one embodiment, may include any known computer input device including a touch panel, a button, a keyboard, a stylus, or the like. The input device 206 may receive data from the sensor module 212. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the control module 104.

The sensor module 212 may include various sensors to detect movement of one or more facial parts of a user (e.g., an upper jawbone of a user relative to a lower jawbone of the user). The one or more facial parts of the user may include an upper jawbone, a lower jawbone, one or more cheeks, a nose, one or more nostrils, one or more ears, one or more eyes, one or more eyelids, a tongue, and so forth. In certain embodiments, the sensor module 212 may include detecting one or more of teeth clenching, opening the mouth, closing the mouth, wiggling ears, eyebrow raise, and so forth. In one embodiment, the sensor module 212 may include a pressure sensor positioned in an ear canal of the user. The pressure sensor may detect, via the ear canal of the user, movement of the user's upper jawbone relative to the user's lower jawbone. The pressure sensor may, in some embodiments, detect a change in ear canal volume of the user. In certain embodiments, the sensor module 212 may include a motion sensor that detects head or other movements of the user.

Figure 3:
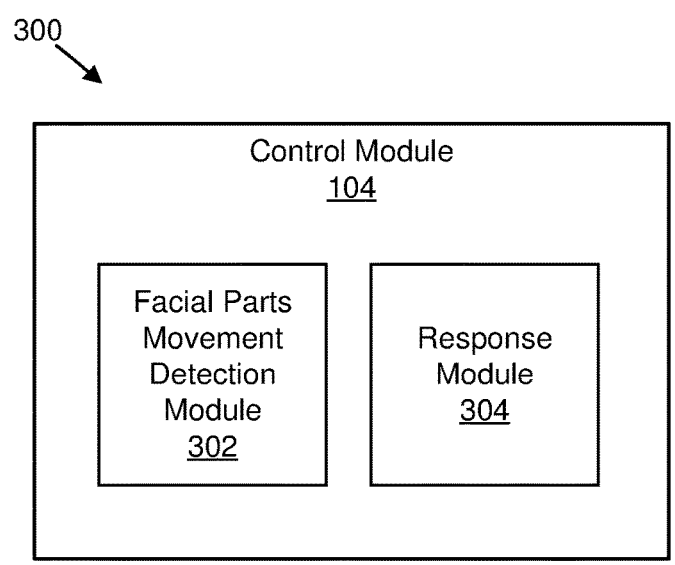
FIG. 3 is a schematic block diagram illustrating one embodiment of an apparatus including a control module.

FIG. 3 depicts a schematic block diagram illustrating one embodiment of an apparatus 300 that includes one embodiment of the control module 104. Furthermore, the control module 104 includes a facial parts movement detection module 302 and a response module 304.

The facial parts movement detection module 302 detects, by use of a sensor (e.g., via the sensor module 212), movement of one or more facial parts of a user. For example, the facial parts movement detection module 302 may detect movement of an upper jawbone (e.g., maxilla) of a user relative to a lower jawbone (e.g., mandible) of the user. In certain embodiments, the sensor is positioned in an ear canal (e.g., external acoustic meatus, external auditory meatus, "EAM") of the user. In some embodiments, the sensor may be any suitable type of sensor. For example, in one embodiment, the sensor is a pressure sensor. As another example, the sensor may include a vibration sensor, a motion sensor, a gyroscope, an accelerometer, or the like. In certain embodiments, the sensor may be part of an earbud, a headphone, a Bluetooth™ device, a wireless device, an electronic device, or the like.

In one embodiment, the response module 304 performs a predetermined action in response to detecting the movement of the one or more facial parts of the user. The predetermined action may be any suitable action configured to respond to the detected movement. For example, the predetermined action may include: activating a voice control feature (e.g., voice commands), answering a phone call, rejecting a phone call, hanging up a phone call, and/or putting a phone call on hold. In some embodiments, the predetermined action may depend on a type of detected movement. For example, in one embodiment, the response module 304 may perform a first predetermined action in response to detecting movement of the upper jawbone toward the lower jawbone (e.g., biting down, closing mouth, clenching jaw, etc.) and/or may perform a second predetermined action in response to detecting movement of the upper jawbone away from the lower jawbone (e.g., opening mouth, etc.). In some embodiments, the response module 304 may perform a predetermined action in response to both detecting movement of the upper jawbone toward the lower jawbone (or movement of one or more other facial parts of the user) and detecting movement of the upper jawbone away from the lower jawbone (e.g., clicking teeth, opening then closing mouth, closing then opening mouth, etc.).

In certain embodiments, the predetermined action may depend on a combination of the detected movement and an additional input. For example, the additional input may include a peripheral device input (e.g., keyboard input, mouse input, touchscreen input, etc.), another sensor input, or the like. In one embodiment, the additional input may include input from a motion sensor. In such an embodiment, the control module 104 may detect a head motion (e.g., a head nod, a head shake, a head turn, a head bend, etc.) of the user via a motion sensor. In certain embodiments, the predetermined action may be performed in response to detecting the head motion. In one embodiment, the predetermined action may be performed in response to a combination of clicking teeth and a head nod. In another embodiment, the predetermined action may be performed in response to a combination of clenching a jaw and a head shake. For example, in certain embodiments, a combination of clicking teeth and a head nod may connect a call, while a combination of clinching a jaw and a head shake may reject a call. In various embodiments, the control module 104 may provide an indication signifying performance of the predetermined action.

Figure 4:
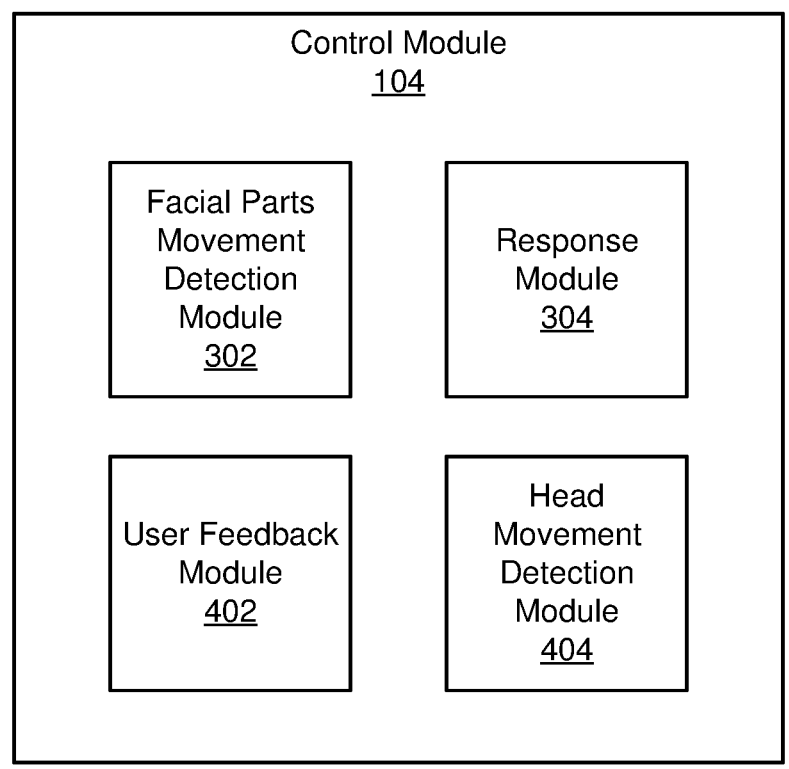
FIG. 4 is a schematic block diagram illustrating another embodiment of an apparatus including a control module.

FIG. 4 is a schematic block diagram illustrating another embodiment of an apparatus 400 that includes one embodiment of the control module 104. Furthermore, the control module 104 includes one embodiment of the facial parts movement detection module 302 and the response module 304, that may be substantially similar to the facial parts movement detection module 302 and the response module 304 described in relation to FIG. 3. The control module 104 also includes a user feedback module 402 and a head movement detection module 404.

The user feedback module 402 provides an indication signifying performance of the predetermined action (e.g., feedback indicating that the predetermined action has been performed). For example, the user feedback module 402 may provide haptic feedback (e.g., vibration feedback via the ear canal, vibration feedback to an information handling device 102 coupled to the sensor, etc.), audio feedback (e.g., audible confirmation via an earbud, audible confirmation via a speaker, etc.), visual feedback (e.g., via a display), and so forth.

In some embodiments, the head movement detection module 404 detects a head motion of the user. In such embodiments, the control module 104 may perform the predetermined action in response to detecting the head motion and/or movement of the one or more facial features of the user. The head movement detection module 404 may detect the head motion via an accelerometer, a motion detector, a gyroscope, a vibration sensor, or the like.

Figure 5:
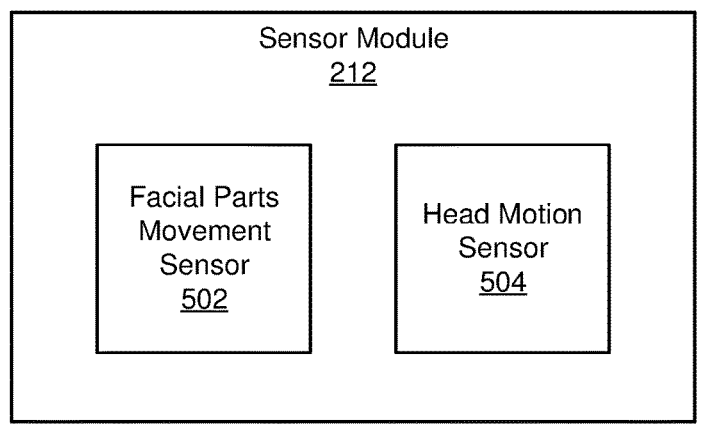
FIG. 5 is a schematic block diagram illustrating an embodiment of an apparatus including a sensor module.

FIG. 5 is a schematic block diagram illustrating an embodiment of an apparatus 500 including the sensor module 212. Furthermore, the sensor module 212 includes a facial parts movement sensor 502 and a head motion sensor 504.

The facial parts movement sensor 502 may be any suitable type of sensor for detecting facial parts movement. For example, the facial parts movement sensor 502 may include a pressure sensor, a vibration sensor, a motion sensor, a gyroscope, an accelerometer, and/or another sensor. In certain embodiments, the head motion sensor 504 may be any suitable type of sensor for detecting head motion. For example, the head motion sensor 504 may include a vibration sensor, a motion sensor, a gyroscope, an accelerometer, and/or another sensor.

Figure 6:
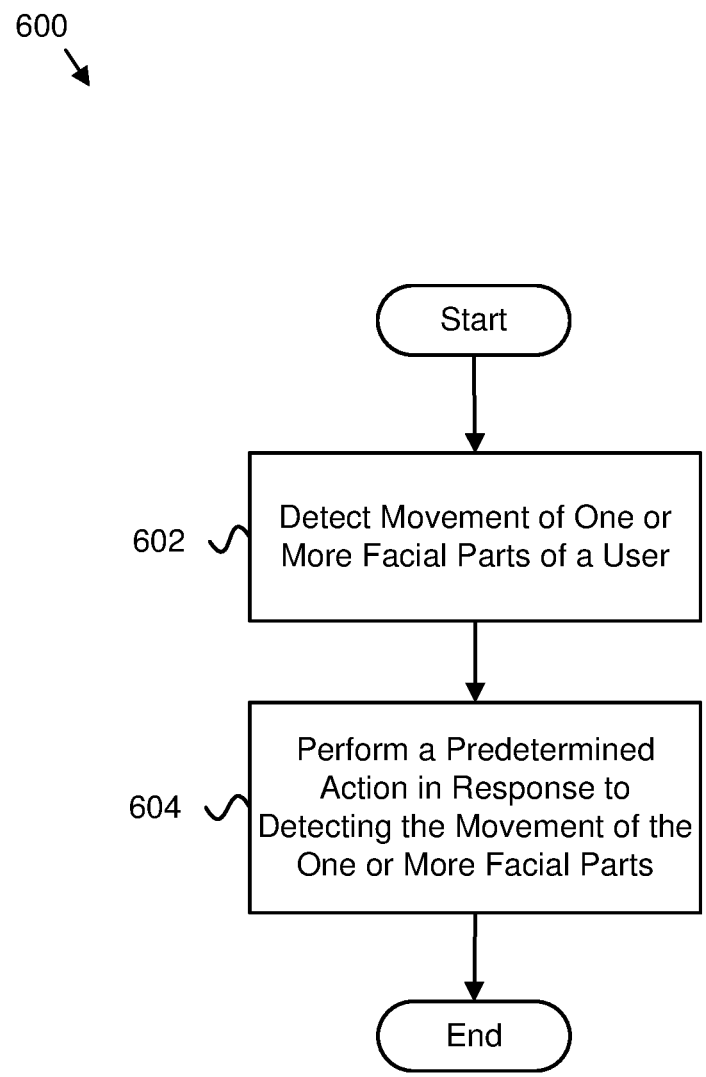
FIG. 6 is a schematic flow chart diagram illustrating an embodiment of a method for performing an action in response to a movement.

FIG. 6 is a schematic flow chart diagram illustrating an embodiment of a method 600 for performing an action in response to a movement. In some embodiments, the method 600 is performed by an apparatus, such as the information handling device 102. In other embodiments, the method 600 may be performed by a module, such as the control module 104. In certain embodiments, the method 600 may be performed by a processor executing program code, for example, a microcontroller, a microprocessor, a CPU, a GPU, an auxiliary processing unit, a FPGA, or the like.

The method 600 may include detecting 602, by use of a sensor (e.g., the sensor module 212), movement of one or more facial features of a user. The sensor may be positioned in an ear canal of the user. In certain embodiments, the facial parts movement detection module 302 may detect 602 the movement of the one or more facial features of the user. In some embodiments, detecting 602 movement of the one or more facial features of the user includes detecting movement of an upper jawbone relative to a lower jawbone using a pressure sensor positioned in the ear canal.

The method 600 may also include performing 604 a predetermined action in response to detecting the movement of the one or more facial features of the user, and the method 600 may end. In certain embodiments, the response module 304 may perform 604 the predetermined action in response to detecting the movement of the one or more facial features of the user. In some embodiments, performing 604 the predetermined action includes performing an action selected from a group including activating a voice control feature, answering a phone call, rejecting a phone call, hanging up a phone call, and putting a phone call on hold.

In one embodiment, the method 600 may include providing an indication signifying performance of the predetermined action. In such an embodiment, the indication may include haptic feedback, or other feedback. In certain embodiments, the method 600 may include performing a first predetermined action in response to detecting movement of an upper jawbone toward a lower jawbone. In some embodiments, the method 600 may include performing a second predetermined action in response to detecting movement of an upper jawbone away from a lower jawbone.

In various embodiments, the method 600 includes detecting a head motion of the user. In such embodiments, performing the predetermined action in response to detecting the movement of the one or more facial features includes performing the predetermined action in response to detecting the head motion.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
a first sensor comprising a pressure sensor;
a second sensor comprising a motion sensor;
a processor;
a memory that stores code executable by the processor to:

detect, by the first sensor, movement of one or more facial parts of a user, wherein the first sensor is positioned in an ear canal of the user;

detect, by the second sensor, a head motion of the user; and perform a predetermined action in response to detecting the movement of the one or more facial parts and the head motion, wherein the predetermined action is selected from the group consisting of activating a voice control feature, answering a phone call, rejecting a phone call, hanging up a phone call, and putting a phone call on hold.

2. The apparatus of claim 1, wherein the code executable by the processor provides an indication signifying performance of the predetermined action.

3. The apparatus of claim 1, wherein the code executable by the processor performs a first predetermined action in response to detecting movement of an upper jawbone toward a lower jawbone.

4. The apparatus of claim 1, wherein the code executable by the processor performs a second predetermined action in response to detecting movement of an upper jawbone away from a lower jawbone.

5. A method comprising:

detecting, by a first sensor comprising a pressure sensor, movement of one or more facial parts of a user, wherein the first sensor is positioned in an ear canal of the user;

detecting, by a second sensor comprising a motion sensor, a head motion of the user; and performing a predetermined action in response to detecting the movement of the one or more facial parts and the head motion, wherein the predetermined action is selected from the group consisting of activating a voice control feature, answering a phone call, rejecting a phone call, hanging up a phone call, and putting a phone call on hold.

6. The method of claim 5, wherein detecting movement of the one or more facial parts comprises detecting movement of an upper jawbone relative to a lower jawbone using a pressure sensor positioned in the ear canal.

7. The method of claim 5, further comprising providing an indication signifying performance of the predetermined action.

8. The method of claim 7, wherein providing the indication comprises providing haptic feedback.

9. The method of claim 5, further comprising performing a first predetermined action in response to detecting movement of an upper jawbone toward a lower jawbone.

10. The method of claim 5, further comprising performing a second predetermined action in response to detecting movement of an upper jawbone away from a lower jawbone.

11. A program product comprising a non-transitory computer readable storage medium that stores code executable by a processor, the executable code comprising code to perform:

detecting, by a first sensor comprising a pressure sensor, movement of one or more facial parts of a user, wherein the sensor is positioned in an ear canal of the user;

detecting, by a second sensor comprising a motion sensor, a head motion of the user; and performing a predetermined action in response to detecting the movement of the one or more facial parts and the head motion, wherein the predetermined action is selected from the group consisting of activating a voice control feature, answering a phone call, rejecting a phone call, hanging up a phone call, and putting a phone call on hold.

12. The program product of claim 11, wherein the executable code further comprises code to perform providing an indication signifying performance of the predetermined action.

13. The program product of claim 12, wherein providing the indication comprises providing haptic feedback.

14. The program product of claim 11, wherein the executable code further comprises code to perform performing a first predetermined action in response to detecting movement of an upper jawbone toward a lower jawbone.

15. The program product of claim 11, wherein the executable code further comprises code to perform performing a second predetermined action in response to detecting movement of an upper jawbone away from a lower jawbone.

* * * * *